United States Patent [19]
Wastl et al.

[11] 3,734,603
[45] May 22, 1973

[54] PROJECTOR FOR ANALYTICAL VIEWING OF MOVING PICTURES

[75] Inventors: Max E. Wastl; Richard L. Shirley, both of Lafayette, Ind.

[73] Assignee: Lafayette Instrument Company, Inc., Lafayette, Ind.

[22] Filed: May 3, 1971

[21] Appl. No.: 139,760

Related U.S. Application Data

[63] Continuation-in-part of Ser. No. 801,247, Feb. 18, 1969, abandoned.

[52] U.S. Cl. ............................352/169, 352/137
[51] Int. Cl. .............................................G03b 21/38
[58] Field of Search.............................352/137, 169

[56] References Cited

UNITED STATES PATENTS

| | | | |
|---|---|---|---|
| 3,432,228 | 3/1969 | Hellmund | 352/137 X |
| 3,397,937 | 8/1968 | Schrader | 352/169 |
| 3,591,265 | 7/1971 | Shropshire | 352/169 X |
| 3,489,492 | 1/1970 | Kobler | 352/137 X |

*Primary Examiner*—Samuel S. Matthews
*Assistant Examiner*—Monroe H. Hayes
*Attorney*—Howard H. Darbo et al.

[57] ABSTRACT

The moving action is stopped and started by a solenoid, with diverse methods of control to stop the action or to show the successive frames on the film at varying rates such as one per second to eight per second. To interrupt the advancing of the film through the light beam, the conventional claw-actuating cam is retracted so that it does not thrust the claw into engagement with the film aperture. At the same time, the auxiliary feed of the film toward and from the loop advanced by the claw is interrupted by axially shifting a clutch member. The clutch member may also be a brake; or the parts which are to stop when it disengages may be isolated from rotating parts. The shutter operates continuously, maintaining constant light intensity. A timing cam rotates continually with the shutter to time the actuation of the solenoid accurately for resuming all feeding operations. Another cam, rotating with the drive for the auxiliary feed controls the timing for the de-energization of the solenoid to discontinue the feed operations. An air jet blows on the film and on the optical member adjacent to it on the lamp side of the film, providing thoroughly adequate cooling of the film even when stopped indefinitely. Other details ensure reliable operation.

12 Claims, 3 Drawing Figures

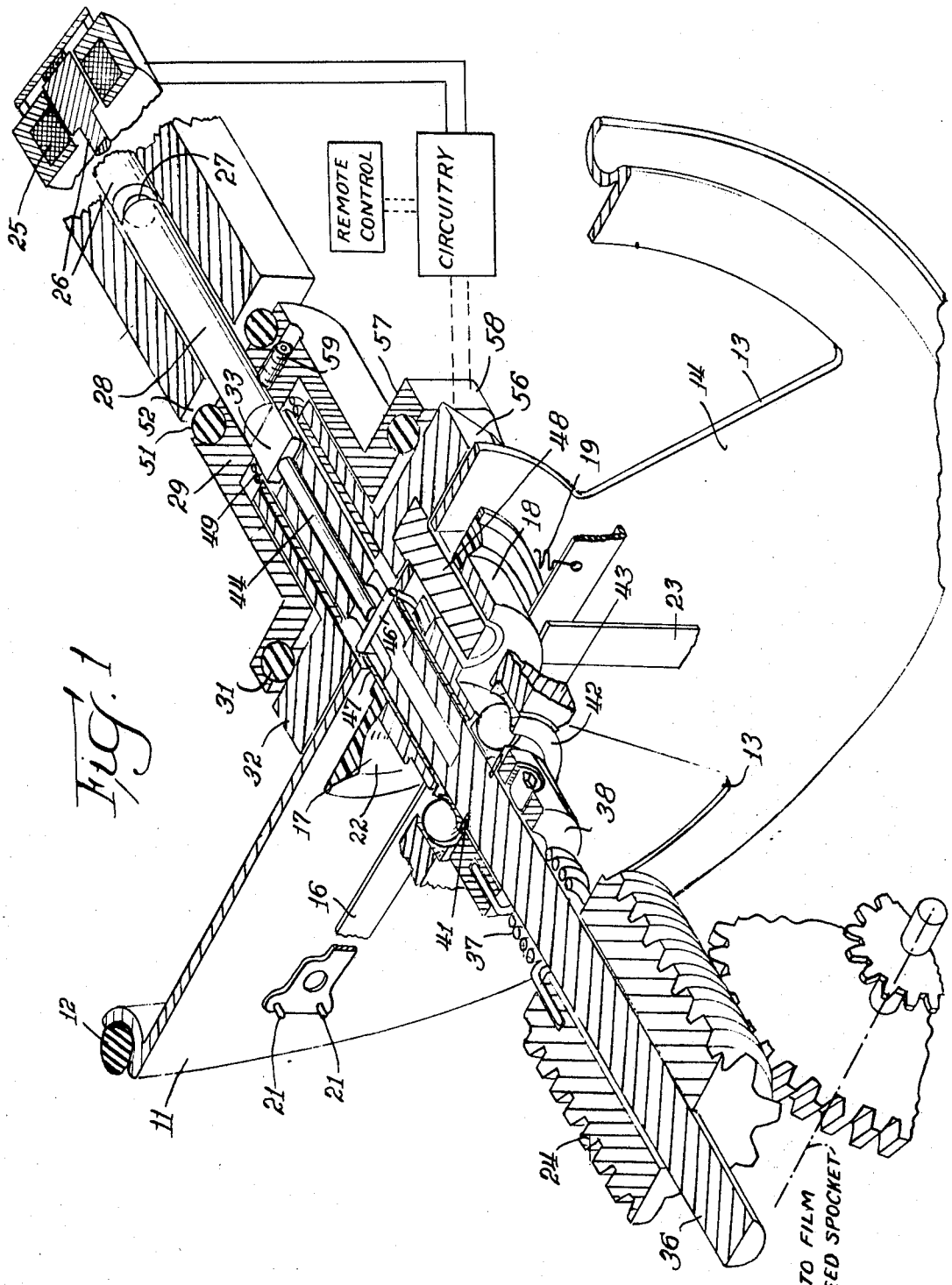

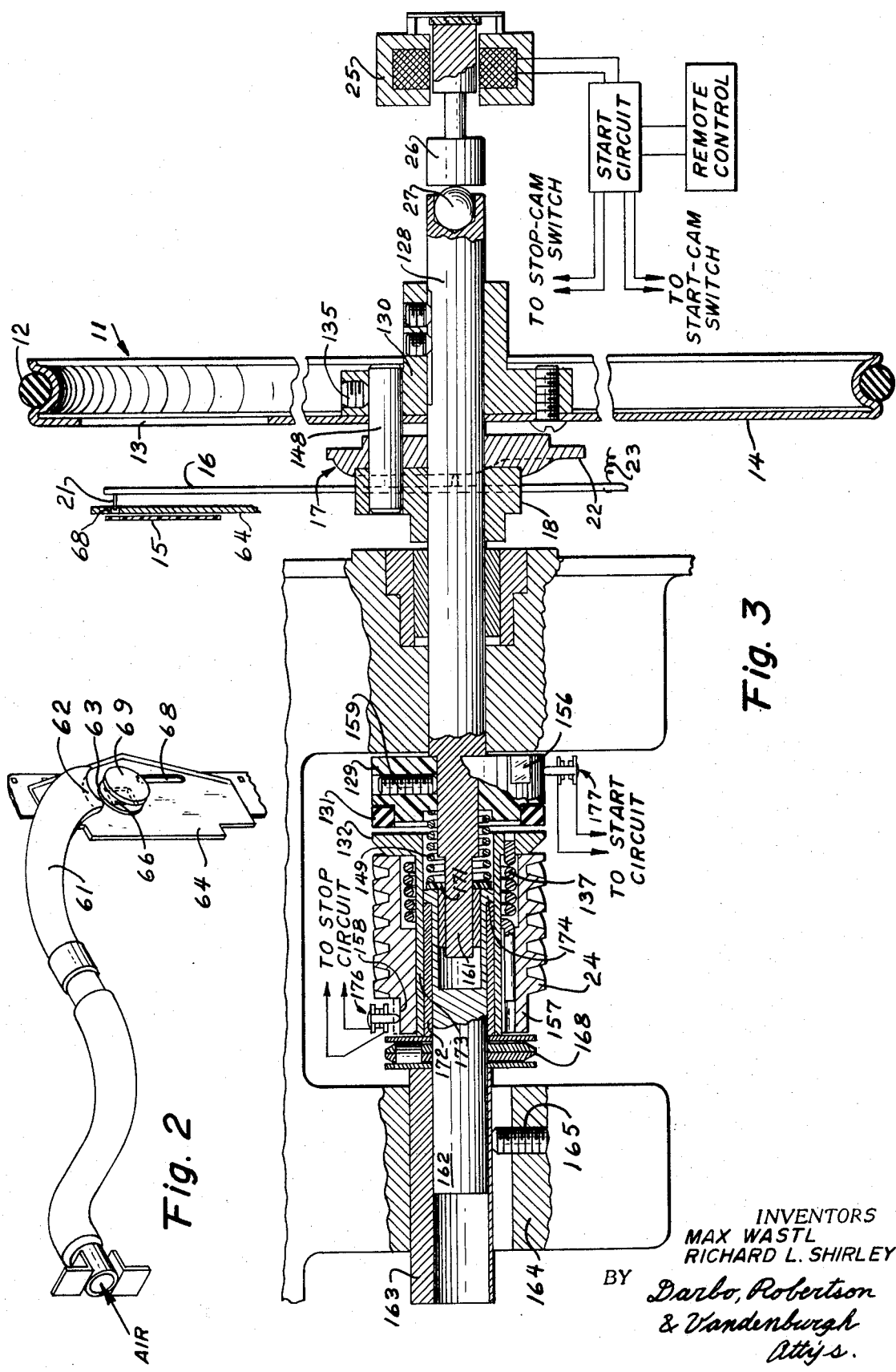

3,734,603

PROJECTOR FOR ANALYTICAL VIEWING OF MOVING PICTURES

INTRODUCTION

This application is a continuation-in-part of our application Ser. No. 801,247 filed Feb. 18, 1969, now abandoned.

The invention of which the present disclosure is offered for public dissemination if adequate patent protection is available relates to moving picture projectors of the class used for analytical viewing. A typical use of such projectors is in viewing game movies by the coach and team. It is desirable to be able to run the projector at normal speed until a point to be examined carefully is reached, and then have a wide choice of different operations of the projector. Although many projectors have either two-speed or variable-speed operation, an analytical projector interrupts the film feeding so as to leave one frame of the film in the light beam for as long as may be desired, then advances the film, perhaps at substantially full speed, to another frame, holding it or not. The choice is preferably according to which button has been pressed on a remote control hand-held unit.

Preferably control is such that the operator or coach can either press a button to stop the feed until it is started again by pressing a button, can select any one of several intermittent rates of actuation of the film feeders, and can also reverse the feed.

With such interrupted feeds, there are various complex problems. Such analytical projectors prior to developments leading to the present have been of complex nature requiring a very high selling price. The present invention provides quiet operation by using a friction clutch, although safely ensuring proper phasing each time the clutch engages. It also provides a simpler mechanism and permits considerable cost reduction. It nevertheless provides ideal operation, with necessary cyclic timing of the feed interruption and resumption. The shutter rotation is not interrupted, nor is the protective filtering or the like changed, and hence the strength of illumination which the operator has chosen for normal running will be retained. With good photography, there is surprisingly little loss of details when a single frame is being viewed. The stopped film is adequately cooled by a jet of air blowing both on it and on the optic member adjacent to it on the lamp side. Operation is quite quiet, more so than with some predecessors.

Additional advantages and objects will be apparent from the following description and from the drawings.

DESIGNATION OF FIGURES

FIG. 1 is a perspective type of horizontal sectional view of a preferred form of the apparatus, some clearances being exaggerated and some parts simplified for clarity.

FIG. 2 is a perspective type of view of the film cooling system, as seen somewhat from the rear, the lamp side of the film.

FIG. 3 is a horizontal sectional view through a simplified modification of the invention.

BACKGROUND DESCRIPTION

Some principal parts of the illustrated embodiments of the invention are largely conventional. In fact, the present invention has been manufactured by modifying Kodak Analyst Projector Model BP-16AR.

A rotating shutter 11 is driven constantly by a belt 12. It is provided with three apertures 13 for passing the projection beam of light. While the beam is cut off by one of the webs 14 between the apertures 13, the strip of movie film 15 is advanced.

The advancement of the film is accomplished by a claw arm 16 which is operated by a cam assembly 17. Vertical movement of the claw arm 16 is effectuated by cam 18 and return spring 19, while horizontal movement of claw arm 16, to move its claws 21 into and out of the film, is accomplished by cam 22 and axially directed return spring 23.

The claws 21 should move only a free loop of the film. The usual supply and take-up sprockets for maintaining this free loop, though not shown, are driven by a worm gear 24. For the purpose of the present invention, it is important that each revolution of the worm 24 drive the sprockets the correct amount for advancing the film exactly one frame. During normal projection, the worm 24 rotates with the rotary shutter 11, in fact is driven by it. However, the illustrated manner of driving the worm by the rotary shutter is part of the present invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

EARLIER PREFERRED FORM OF INVENTION

FIG. 1 illustrates a form of the invention which was preferred when the parent application was filed.

During normal operation the parts are substantially in the position shown in FIG. 1. A solenoid 25 is energized to thrust the solenoid-actuated plungers 26 and 28, separated by ball 27, axially in the more leftward direction of FIG. 1. This direction, being in the direction of projection, may be called "forward". Plunger 28 carries clutch-brake hub 29 into engagement (through O-ring 31) with clutch disk 32 rigidly carried on rotary shutter 11. Thus, while the solenoid is energized, hub 29 and plunger 28 rotate with rotary shutter 11. Plunger 28 is provided with a flat key 33 telescopically movable axially in a slot at the right or rear end of axially-fixed drive shaft 36. Thus the drive shaft 36 is also driven while the solenoid is energized. The drive shaft 36 drives the worm 24, preferably through a shock absorbing spring 37. The spring 37 also presses the worm 24 forwardly to its proper position against the usual thrust bearing (not shown) and presses a bushing 38 rearwardly. Inasmuch as the bushing 38 is locked to shaft 36, this also presses the shaft to its proper axial position determined by snap ring 41 resting against the inner race of ball bearing assembly 42 which is carried by a fixed portion 43 of the projector.

Also while the solenoid is energized, plunger 28, by its reduced extension 44, presses against transversely extending pin 46. Pin 46 thrusts on the rear face of bearing sleeve 47 of claw-actuation cam 17 thereby holding this cam in its proper operating position. Cam assembly 17 is slidable along shaft 36 and along a crank pin 48 carried by clutch disk 32 for turning cam assembly 17. When the solenoid is de-energized, return spring 49 presses clutch-brake hub 29 rearwardly the slight amount needed to release it from clutch disk 32 and engage it, through O-ring 51, with journal block 52 which serves as a brake block. Thus there is quick stopping of hub 29, plunger 28, the key 33, drive shaft 36 and worm 24. This stops the driving of the auxiliary feed sprockets. At the same time, extension 44 releases pin 46 so that the pressure of spring 23 on claw arm 16 moves the claw arm 16 and cam assembly 17 rearwardly so that the claw arm no longer thrusts its claws 21 into the plane of the film. Accordingly the claw arm 16 goes through its usual movements, but idly. Bearing sleeve 47, pressed into hub 29, smoothly fits drive shaft 36 and freely moves axially along it the distance permitted by movement of pin 46 and extension 44 of plunger 28. Pin 46 can be considered a disabling means, inasmuch as it functions to disable the claw moving mechanism by allowing it to move to an ineffective position.

When the solenoid is again energized, it simultaneously thrusts clutch-brake hub 29 and claw-actuating cam assembly 17 into their respective normal operating positions so that the drive of the various feeding means is resumed.

Although allowing the claw arm 16 to operate continuously while idle aids in achieving simplicity, it necessitates dependable timing of the energization or de-energization of the solenoid with respect to the cycle of operation of the claw arm 16. The shift of cam assembly 17 between its idle position and its effective position must occur during the return vertical stroke of the claw arm 16, so that it will always leave a frame of the film properly centered and will always mesh with the perforations of the film when it is about to advance the film. This is achieved by switch-operating cams rotating with the other rotary parts. The starting of feed, for which energization of the solenoid is assumed, must be timed by a cam constantly rotating with the claw actuating cam 17. Clutch disk 32 can conveniently serve to provide this cam, and it is accordingly shaped with a timing cam portion 56.

The stopping action can be timed with a part which is rotating only during the feeding of the film, and hence a flange 57 on hub 29 (this flange also forming a clutch disk) is conveniently used. Accordingly a timing cam portion 58 is provided on this flange. Although the cam portions have been shown as projections, they could also be flats lying within the circle formed by the intermediate dwell portions of the cams, and flats are in fact used.

The proper angular positioning of cam portions 56 and 58 will depend upon the reaction times of the system, including the circuitry and the solenoid. Although there is more chance of variation as to the timing in the case of de-energization of the solenoid than as to its energizing time, adjustment for this is provided. Thus, the angular positioning of cam 58 is easily adjusted, upon loosening set screw 59. Inasmuch as the axial movement of the parts is less than a sixteenth of an inch, it occupies a very small part of the total time available during the return vertical stroke of claw arm 16. The adjustment here mentioned could perhaps be avoided, but is only a manufacturing adjustment to achieve or make possible correct relative timing of reengagement so that the cam assembly 17 will make exactly one revolution (or a multiple thereof) with respect to hub 29 for each interruption of drive. This may be called "in step" engagement.

CIRCUITRY CHARACTERISTICS

Although circuitry can easily be provided by technicians in that field, it may be helpful to note some characteristics and mode of operation of circuitry found suitable, as follows.

Assume that the mode of operation desired is one frame at a time, on demand, and the projector is not advancing the film. Then:

1. At some happenstance point in the cycle the operator presses the single frame button.
2. The solenoid is not energized until the next start timing pulse derived from cam 56 is received at a "start" transistor, causing flow of current by which the solenoid is energized.
3. The total reaction time between switch closure by cam 56 and clutch contact may correspond to 180° rotation of the parts. The design position of cam 56 must allow for the reaction time, so that the claw will be activated in the center of its return from framing motion.
4. Hub 29 is stopped at exactly one complete revolution. For this a pulse derived from the other cam, cam 58, is received at the base of a "stop" transistor. This triggers cessation of the solenoid current and deactivates the solenoid. The adjustment of cam 58 allows the necessary reaction time.

Operating in the automatic timing mode is somewhat more complex and is described below:

1. At some happenstance point in the cycle the operator switches the unit into the AUTO mode.
2. An impulse derived from cam 56 causes the charge of a timing capacitor to be dumped into the base of the first mentioned transistor.
3. At the same time a third transistor is activated to dissipate the remaining charge on the timing capacitor. For consistency in timing, the capacitor must begin charging from the same initial value each time.
4. After one revolution the stop-timing cam 58 signals a fourth transistor which triggers the stop transistor and the solenoid releases.
5. At the same time, the timer control transistor is turned off allowing the timing capacitor to charge.
6. After the capacitor is sufficiently charged to fire an A078 neon, a time depending on the frequency setting, the firing will occur when start-timing cam 56 closes its switch. The frequency selection may, for example, permit selection of any frequency from one frame in two seconds to ten per second. Thus, the timing is absolutely synchronized to the mechanical components of the projector regardless of variations in motor speed, or frequency selection.

Other transistors perform the motor reversing function. The forward-reverse switch selects which of these transistors will be triggered. The trigger pulses come from the stop-timing synchronizer which can simultaneously activate interruption as above, so that the unit can never be reversed in the middle of a framing movement.

FILM COOLING

As seen in FIG. 2, a conduit 61 is connected to a source of air and has an outlet 62 directing a blast of air to cool optical element 63 and the film 15 where exposed through aperture 66 in plate 64. A second optical element 69, more remote from the film, may be less directly in the air blast. Slot 68 receives the claws 21 of FIG. 1.

SIMPLIFIED FORM NOW PREFERRED.

FIG. 3 represents a considerable simplification of the invention recently achieved by further invention. An important part of the new simplification was in recognizing that there would be no harm in having the shutter disk 11 move axially the slight amount required for clutch actuation and for shifting the cam assembly 17, and that this in turn would permit mounting the shutter 11 rigidly on a single simple shaft serving the purposes previously served by both plunger 28 and driveshaft 36.

As seen in FIG. 3, the simplified plunger-driveshaft 128 carries rigidly thereon a hub 130 of the rotary shutter 11, and shiftable clutch member 129. Except for factory adjustment, for which the set screws shown are provided, these parts can be permanently mounted on plunger-driveshaft 128. The claw-operating cam assembly 17 is likewise permanently and rigidly mounted on the plunger-driveshaft 128, subject to factory adjustment. In this instance, partly for maximum similarity to prior parts, the axial adjustment of cam assembly 17 is by set screw 135 engaging crank pin 148, which in this instance has a drive fit in the cam assembly 17 so as to be rigid therewith.

Because rotary shutter 11 is driven by a belt 12, the axial movement of the rotary shutter 11 when it moves something like one-sixteenth of an inch each time the feed of film is stopped or started is harmless. Hub 130 thus moves both shutter 11 and cam assembly 17 axially, and is thus a disabling means for cam assembly 17 when stopping the film is desired.

Additional details of this simplified form of the invention are probably apparent from FIG. 3, or would be understood by machine designers. Thus the plunger-driveshaft 128 is shown having a sliding as well as rotative fit in sleeve bearing 161 carried by stud 162 in holder 163 which is mounted in machine frame bracket 164. Set screw 165 tightens to hold both firmly positioned.

A coil compression spring 149 exerts axial thrust on plunger-driveshaft 128 toward the right, so that when the solenoid 25 is de-energized, this shaft and its rigidly mounted parts will move to the right, thereby disengaging clutch friction ring 131 from clutch disc 132, and moving claw actuating cam assembly 17 to the right so that claws 21 will not engage film 15.

When solenoid 25 is actuated, the cam assembly 17 shifts to the left again so that at the start of each film feeding stroke claws 21 will enter the apertures of the film 15, and friction ring 131 will engage clutch member 132. This will not only drive sprocket actuating worm 24, but will exert a thrust on it to the left, this thrust being taken up by a thrust bearing 168, which is preferably of the rolling antifriction type, such as a roller bearing.

In FIG. 3, if any parts have been given numbers without description, it is because they have so nearly the same function as described with respect to FIG. 1 that no description is needed, the same numbers used in FIG. 1 being used in FIG. 3, although sometimes with a digit 1 added in front of it.

FIG. 3 does not show any brake corresponding to the FIG. 1 parts 51 and 52. The need for a brake is removed by completely isolating worm 24 from rotational torque parts, when clutch ring 131 is disengaged from clutch element 132. Stud 162 is an important part in providing this isolation, and may be called an isolation stud. Being non-rotative, it does not transmit any torque received from washer 171, preferably nylon, to the worm 24. This is the only point where rotative torque could otherwise pass to the worm 24. The worm 24 and clutch member 132 are prevented from drifting to the right to be lightly engaged by friction member 131. This is accomplished by bearing sleeve 172 which has a press fit in tubular shank 173 of clutch element or disc 132, and is restrained from drift toward the right by flange 174 on isolation stud 162. Isolation stud 162 fits smoothly through bearing sleeve 172, for free rotation, and the adjustment of the assembly 162, 163 axially is snug but not binding, so that the assembly 132, 172 can rotate freely but cannot move axially appreciably. Of course, worm 24 is free to rotate on shank 173 of clutch disc 132, except as cushion spring 137 resiliently ties the two parts angularly.

There is so little angular momentum in the worm 24 and the few parts which rotate with it, compared to the friction they encounter, that their rotation stops with reasonable promptness after disengagement between friction ring 131 and clutch disc 132. Slight variations in the stopping position of worm 24 are negligible, because there is considerable leeway before cam 158 will be so out of phase that it would cause (through the stop circuit and solenoid 25) the plunger-driveshaft 128 to shift to the right at any time other than in the return stroke of claw arm 16. With stop leaf switch 176 actuated by cam 158 on worm 24, and start leaf switch 177 actuated by cam 156 which is constantly rotating with the shutter 11 and cam assembly 17, there is no danger of cumulative error.

Both the FIG. 1 form and the FIG. 3 form of the invention are exceedingly satisfactory and quiet in operation, being free from dog type clutches and achieving dependability in proper stopping and starting, and in phasing, even though a friction clutch is used. Both forms are sufficiently simple to be quite commercial, and in fact the more complex form of FIG. 1 has already been commercially successful. The greater simplification of FIG. 3 is expected to lead to still greater commercial success. The improvements of FIG. 3 over FIG. 1 would theoretically be useful with a dog type of clutch, if the noise can be tolerated or sufficiently reduced.

The drawings are of course illustrative rather than necessarily accurate. For example, parts such as switches, cams therefor, and set screws are sometimes moved from their actual positions so as to show in the drawings.

We claim:

1. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; and disabling means actuated by the same plunger for rendering the claw-actuating means ineffective to advance the film, said friction clutch and disabling means being both operated by opposite movement of the plunger for simultaneous engagement of the clutch and restoration of the effectiveness of the claw-actuating means;

and means for preventing cumulative error in phase relationship between the cam and auxiliary drive arising upon multiple actuations of the friction clutch.

2. A stop motion projector for analytical viewing including a constantly driven shutter; a claw-actuating cam constantly rotating with the shutter but axially movable; auxiliary drive means for auxiliary film feed means, normally rotating with the shutter;

means for interrupting the film feed comprising a solenoid, a plunger actuated by the solenoid along the axis of the shutter, a clutch member axially actuated by the plunger to frictionally couple the shutter and auxiliary drive means for joint rotation upon actuation of the plunger in the starting direction; a shaft extending through the shutter and claw-actuating cam along the axis thereof to drive the auxiliary drive means; and means movable axially by the plunger for moving the claw-actuating cam axially in one direction, said cam and its claw being biased in the opposite axial direction, whereby movement of the plunger simultaneously shifts the claw-actuating cam to its effective position and engages the clutch for drive of the auxiliary feed means;

and means for preventing cumulative error in phase relationship between the cam and auxiliary drive arising upon multiple actuations of the friction clutch.

3. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch-brake member actuated by the plunger to couple the shutter and auxiliary drive means for joint rotation upon actuation of the plunger in the starting direction and for stopping the auxiliary drive means upon actuation of the plunger in the opposite direction; and disabling means actuated by the same plunger for rendering the claw-actuating means ineffective to advance the film, said friction clutch-brake member and disabling means being both operated by starting direction movement of the plunger for simultaneous engagement of the clutch and restoration of the effectiveness of the claw-actuating means;

and means for preventing cumulative error in phase relationship between the cam and auxiliary drive arising upon multiple actuations of the friction clutch.

4. A stop motion projector for analytical viewing including a constantly driven shutter; claw-actuating means including a cam constantly rotating with the shutter but axially movable; auxiliary drive means for auxiliary film feed means normally rotating with the shutter;

means for interrupting the film feed comprising a power actuated plunger, a friction clutch member axially actuated by the plunger to frictionally couple the shutter and auxiliary drive means for joint rotation upon actuation of the plunger in the starting direction; a shaft extending through the shutter and claw-actuating cam along the axis thereof to drive the auxiliary drive means; and positioning means movable axially by the plunger for moving the claw-actuating cam axially in one direction, said claw-actuating means being biased in the opposite axial direction; whereby movement of the plunger in the starting direction shifts the positioning means to position the claw-actuating cam in its effective position and simultaneously engages the clutch for drive of the auxiliary feed means.

5. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; and disabling means actuated by the same plunger for rendering the claw-actuating means ineffective to advance the film, said friction clutch and disabling means being both operated by starting movement of the plunger for simultaneous engagement of the clutch and restoration of the effectiveness of the claw-actuating means;

and means for preventing cumulative error in phase relationship between the cam and auxiliary drive arising upon multiple actuations of the friction clutch, including cam means, rotatable with the claw-actuating cam for timing the starting plunger movements relative to cycle thereof.

6. A stop motion projector for analytical viewing including a constantly driven shutter; a claw-actuating means including a cam constantly rotating with the shutter but axially movable; auxiliary drive means for auxiliary film feed means, normally rotating with the shutter;

means for interrupting the film feed comprising a solenoid-actuated plunger shiftable along the axis of the shutter, a clutch-brake member secured to the plunger to engage the shutter to be rotated with it, upon actuation of the plunger in the starting direction; and axially fixed shaft having telescopic and keyed engagement with the plunger to be driven by the clutch member and extending through the shutter and claw-actuating cam along the axis thereof to drive the auxiliary drive means; and a transversely disposed pin extending laterally from said shaft through slots and movable axially of the shaft in said slots, moved axially in one direction, said claw-actuating means being spring actuated in the opposite axial direction; said cam and pin being free for relative rotation between them;

and means for preventing cumulative error in phase relationship between the cam and auxiliary drive arising upon multiple actuations of the friction clutch.

7. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; opposite movement of the plunger rendering the claw-actuating means ineffective to advance the film, and disengaging said friction clutch;

said plunger being a shaft carrying the shutter and claw-actuating means firmly thereon and moving them slightly axially as it engages and disengages the clutch, and rotating with them constantly to drive the auxiliary drive means when the clutch is engaged, and means for preventing cumulative error in phase relationship between the cam and auxiliary drive arising upon multiple actuations of the friction clutch.

8. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; opposite movement of the plunger rendering the claw-actuating means ineffective to advance the film, and disengaging said friction clutch;

said plunger being a shaft carrying the shutter and claw-actuating means firmly thereon and moving them slightly axially as it engages and disengages the clutch, and rotating with them constantly to drive the auxiliary drive means when the clutch is engaged;

said auxiliary drive means being isolated from all rotating influence when the clutch is disengaged;

and means for preventing cumulative error in phase relationship between the cam and auxiliary drive arising upon multiple actuations of the friction clutch.

9. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; opposite movement of the plunger rendering the claw-actuating means ineffective to advance the film, and disengaging said friction clutch;

said auxiliary drive means being isolated from all rotating influence when the clutch is disengaged;

and means for preventing cumulative error in phase relationship between the cam and auxiliary drive arising upon multiple actuations of the friction clutch.

10. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a clutch member actuated by the plunger to couple the shutter and auxiliary drive means for joint rotation upon actuation of the plunger in the starting direction; opposite movement of the plunger rendering the claw-actuating means ineffective to advance the film, and disengaging said clutch;

said plunger being a shaft carrying the shutter and claw-actuating means firmly thereon and moving them slightly axially as it engages and disengages the clutch, and rotating with them constantly to drive the auxiliary drive means when the clutch is engaged;

and means for preventing cumulative error in phase relationship between the cam and auxiliary drive arising upon multiple actuations of the friction clutch.

11. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a clutch member actuated by the plunger to couple the shutter and auxiliary drive means for joint rotation upon actuation of the plunger in the starting direction; opposite movement of the plunger rendering the claw-actuating means ineffective to advance the film, and disengaging said clutch;

said plunger being a shaft carrying the shutter and claw-actuating means firmly thereon and moving them slightly axially as it engages and disengages the clutch, and rotating with them constantly to drive the auxiliary drive means when the clutch is engaged;

said auxiliary drive means being isolated from all rotating influence when the clutch is disengaged;

and means for preventing cumulative error in phase relationship between the cam and auxiliary drive arising upon multiple actuations of the clutch.

12. A stop motion projector for analytical viewing including a constantly driven shutter; a claw-actuating means including a cam constantly rotating with the shutter; auxiliary drive means for auxiliary film feed means, normally rotating with the shutter;

means for interrupting the film feed comprising a power-actuated plunger, a friction clutch member actuated by the plunger to couple the shutter and auxiliary drive means for joint rotation upon actuation of the plunger in the starting direction; opposite movement of the plunger rendering the claw-actuating means ineffective to advance the film, and disengaging said clutch;

said auxiliary drive means being isolated from all rotating influence when the clutch is disengaged;

and means for preventing cumulative error in phase relationship between the cam and auxiliary drive arising upon multiple actuations of the friction clutch.

* * * * *